United States Patent
Bharadwaj et al.

(10) Patent No.: US 7,792,301 B2
(45) Date of Patent: Sep. 7, 2010

(54) ACCESS CONTROL AND ENCRYPTION IN MULTI-USER SYSTEMS

(75) Inventors: Vijay G Bharadwaj, Redmond, WA (US); Duncan G Bryce, Redmond, WA (US); Mike Hamburg, Stamford, CT (US); Ravindra N Pandya, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 853 days.

(21) Appl. No.: 11/427,660

(22) Filed: Jun. 29, 2006

(65) Prior Publication Data

US 2008/0022361 A1    Jan. 24, 2008

(51) Int. Cl.
*H04L 9/00* (2006.01)
(52) U.S. Cl. ............... 380/277; 726/2; 726/16; 726/21; 707/1; 707/9
(58) Field of Classification Search .............. 707/1, 707/9; 726/2, 16, 21; 380/277
See application file for complete search history.

(56) References Cited

U.S. PATENT DOCUMENTS

| | | | |
|---|---|---|---|
| 6,249,866 B1 | 6/2001 | Brundrett et al. | |
| 6,363,488 B1 | 3/2002 | Ginter et al. | |
| 6,678,828 B1 | 1/2004 | Pham et al. | |
| 6,697,944 B1 | 2/2004 | Jones et al. | |
| 6,931,530 B2 | 8/2005 | Pham et al. | |
| 7,110,982 B2 | 9/2006 | Feldman et al. | |
| 7,155,415 B2 | 12/2006 | Russell et al. | |
| 7,213,266 B1 | 5/2007 | Maher et al. | |
| 7,406,603 B1 | 7/2008 | MacKay et al. | |
| 2002/0019935 A1 | 2/2002 | Andrew et al. | |
| 2002/0141574 A1* | 10/2002 | Henson et al. | 380/44 |
| 2003/0046366 A1 | 3/2003 | Pardikar et al. | |
| 2006/0018484 A1* | 1/2006 | Yoshihiro et al. | 380/277 |
| 2008/0216169 A1* | 9/2008 | Naizhen et al. | 726/16 |

OTHER PUBLICATIONS

Marks, "Using Win2000's Foolproof Encryption", Network Computing, Oct. 30, 2000, pp. 156-158.
"Microsoft Windows XP OS: Encrypting File System in Windows XP and Windows.NET Server", Microsoft Corporation, Aug. 2002, 60 pages.
Wolthusen, "Security Policy Enforcement at the File System Level in the Wondows NT Operating System Family", 2001 IEEE pp. 55-63.

* cited by examiner

*Primary Examiner*—Nasser Moazzami
*Assistant Examiner*—Lisa Lewis
(74) *Attorney, Agent, or Firm*—Lee & Hayes, PLLC

(57) ABSTRACT

In a storage system, multiple information units are individually associated with an access control policy (ACP) of multiple ACPs. Each respective information unit corresponds to a respective information unit encryption key (IUEK). The multiple information units are grouped into encryption zones based on their associated ACPs. In a described implementation, each ACP is associated with a zone root key (ZRK). In another described implementation, each IUEK corresponding to a given information unit is encrypted by an IUEK corresponding to an information unit at a most-proximate linked node of the storage system.

6 Claims, 9 Drawing Sheets

ACCESS CONTROL AND ENCRYPTION IN MULTI-USER SYSTEMS

BACKGROUND

Computers are used for many different tasks in a variety of environments. For example, computers are used in people's personal lives to conduct financial transactions and communicate private thoughts. Computers are also used in professional environments to share vital business information, collaborate on technical projects, exchange business plans, and so forth. In many such cases, people prefer to protect the underlying data by limiting access to it.

In other words, people often prefer to maintain the confidentiality of the data that is being exchanged, shared, stored, etc. using some mechanism. Such mechanisms often involve encryption because access to encrypted data may be limited. Unencrypted data is encrypted using an encryption key to produce encrypted data. To access the encrypted data, the same or a cryptographically-related encryption key is used to decrypt the data. The decrypted data may then be accessed in standard manners.

SUMMARY

In a storage system, multiple information units are individually associated with an access control policy (ACP) of multiple ACPs. Each respective information unit corresponds to a respective information unit encryption key (IUEK). The multiple information units are grouped into encryption zones based on their associated ACPs. In a described implementation, each ACP is associated with a zone root key (ZRK). In another described implementation, each IUEK corresponding to a given information unit is encrypted by an IUEK corresponding to an information unit at a most-proximate previous linked node of the storage system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
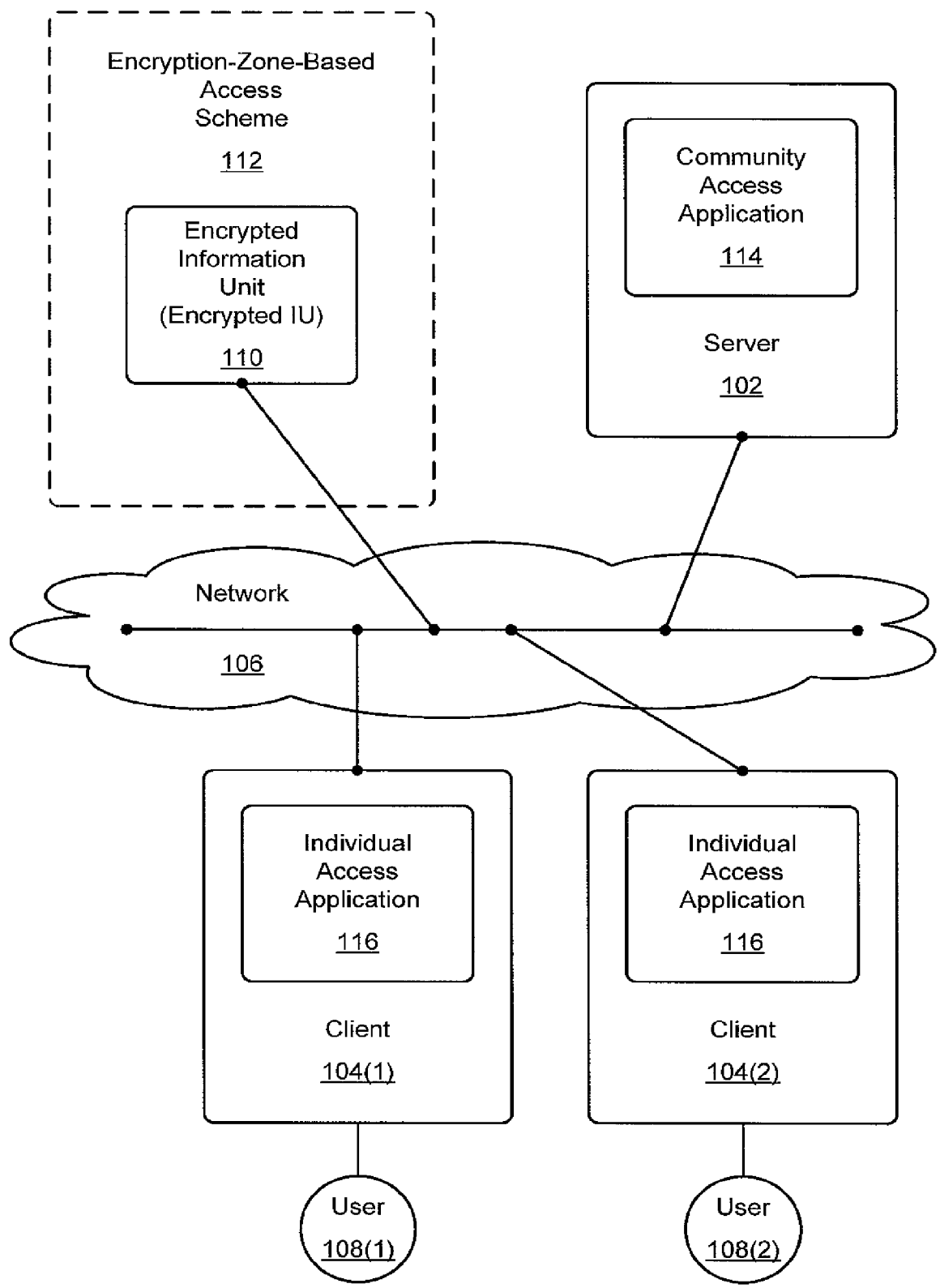
FIG. 1 is a block diagram illustrating an example environment in which an encryption-zone-based access scheme for encrypted information units may be implemented.

Introduction to Access Control and Encryption in Multi-User Systems

In some storage systems, information units are associated with access control policies (ACPs). An ACP is a rule or set of rules that controls access to its associated information unit. It lists or otherwise identifies those users that are permitted to access the associated information unit. The ACP can also indicate what type(s) of accesses are permitted by the users as a group or by individual users. Accesses to information units include, by way of example but not limitation, the following types: read-only access, write access, copy access, move access, some combination thereof and so forth. An ACP can also indicate which user or users is sufficiently privileged to change the ACP information.

In typical hierarchical storage systems, the ACP is inherited. For example, a file information unit that is created within a directory information unit inherits the same ACP that is associated with the directory information unit. Subfolders of the directory information unit, as well as their contents, may also inherit the same ACP. Also, changes to an upper-level information unit may be applied to (i.e., inherited by) those information units that are lower in the hierarchy.

ACPs in hierarchical storage system environments therefore have two useful attributes: First, ACPs enable or provide an ability to specify which users have what access rights to an information unit. Second, ACPs can offer inheritance so that ACPs do not need to be instituted or adjusted manually information-unit-by-information-unit when information units are created, moved, and so forth. These two attributes are particularly relevant to scenarios involving group access to information units.

Encryption, on the other hand, is typically not inherited, even in hierarchical storage systems. In conventional approaches, each information unit is encrypted using, at least partially, an encryption key that is unique to a given user. Consequently, a user may be granted access to a directory folder that includes an encrypted file without also being granted access (e.g., the ability to decrypt) the encrypted file within the directory folder. Moreover, with existing approaches the user would need to be manually granted decryption rights to each individual encrypted file within the directory folder.

The lack of inheritance and the absence of an ability to grant decryption rights to users in groups results in a very tedious mechanism for providing group access to encrypted information units in traditional storage systems, including hierarchical ones. In contrast, certain implementations as described herein enable inheritance to be provided in conjunction with access control and encryption in multi-user systems, along with the automated management of encryption access rights.

In an example described implementation, encryption zones are defined that include information units that are associated with a common ACP. Each respective information unit corresponds to a respective information unit encryption key. Each encryption zone has at least one zone root node that is the initial (e.g., highest, most prominent, entry-point, etc.) node in the encryption zone. Certain (e.g., non-hierarchical) implementations may have multiple zone root nodes. The information unit encryption key of the zone root node or nodes comprises a zone root key for the encryption zone.

Each encryption zone thus corresponds to a zone root key. Each encryption zone is associated with an ACP that is common to all member information units. Hence, each ACP is also associated with the zone root key. A trusted storage holds respective zone root keys in association with respective ACPs. The zone root key controls access to encrypted information units within a corresponding encryption zone.

With the exception of the zone root key, each information unit encryption key is encrypted with the information unit encryption key corresponding to the most-proximate previous linked node in the storage system (e.g., corresponding to the immediately-higher or parent node in a hierarchical storage system). This linked chain of encrypted information unit encryption keys forms an encryption key chain. A file information unit at the terminating node of a linked chain of nodes in a storage system (e.g., at the lower-most node of a branch of a hierarchical storage system) has its data encrypted with its corresponding information unit encryption key.

To access a targeted encrypted information unit, the trusted storage is contacted to retrieve the zone root key associated with the ACP of the targeted encrypted information unit. An encryption key chain terminating at the encrypted information unit is then traversed using the retrieved zone root key. Once the information unit encryption key corresponding to the targeted encrypted information unit is decrypted upon traversing the encryption key chain, the corresponding information unit encryption key is used to decrypt the data of the targeted encrypted information unit.

In another example described implementation, management of a described encryption-zone-based information unit access scheme may be automated. For example, the handling of the encryption-related ramifications of access operations (e.g., read, write, move, copy, delete, etc.) to information units may be automated. Also, encryption-related consequences to changes to ACPs may be automated.

In a described example general implementation, a data storage system has an ACP. The ACP includes a set of rules that associate user privileges with information units. The ACP may also contain rules that can be used to determine the user privileges that the system automatically associates with a newly-created object.

The data storage system may be arranged hierarchically, and many are for administrative and conceptual convenience. The rules to automatically determine and associate user privileges for newly-created objects can adhere to an inheritance model. The ACP may be implemented as an access control list (ACL). However, the data storage system need not be hierarchical, the user privilege association automation need not adhere to inheritance, and the ACP need not be implemented as an ACL. For example, principles of the present invention may be incorporated in a non-ACL system such as those using a UNIX-like permissions approach. Also, the data storage system may be non-hierarchical, such as a database that adopts a relational data model.

Continuing with a described example general implementation, the data storage system has an ACP. The stored information is encrypted, and the encryption keys are placed in an access control system (i.e., a trusted storage) that differs from the actual data storage system. Thus, instead of controlling access to the information directly, access to the keys is controlled. The keys enable the encrypted information to be decrypted and thus accessed fully (within the additional constraints of the ACP-imposed restrictions).

Implementation and management of the cryptographic aspects of the data storage system are facilitated by relying on or borrowing from features of access control schemes that make them easy to manage and administer. First, to facilitate management, an analogous system for the ACP and for the user privilege association automation is implemented for the cryptographic keys. For example, the same high-level ACP may be adopted. This can include the rules for how access privileges or rights are automatically associated onto newly created objects. The term "same high-level ACP" refers to the same overall access rights. In other words, it refers to whether a user has any type of access rights to a given information unit, but it does not necessarily relate to specific types of access rights (e.g., read-only, no copy, etc.) for the given information unit.

Second, the number of unique encryption keys that are to be stored apart from the information units of the actual data storage system may be reduced by identifying objects with the same ACP and storing a single key for each ACP grouping. This is accomplished as described herein through the encryption zone concept and its corresponding zone root key. This information unit grouping increases the efficiency of the overall system so as to make it practical in a real-world environment that has communication limitations as well as finite encryption/decryption processing delays. The corresponding zone root keys are stored in a trusted storage. The information unit grouping is described and the zone root key placement in a trusted storage is introduced with particular reference to FIG. 3.

Third, each information unit is assigned a corresponding unique information unit encryption key. As many keys as is reasonably possible (e.g., those that are not zone root keys) are stored inside the actual data storage system itself. However, the integrated or locally-stored keys are stored in a form that entails accessing the separately-stored zone root keys in order to make the locally-stored keys useful. This is realized with an encryption key chain as described herein, with particular reference to FIGS. 4-6. The encryption key chaining enables efficient handling of ACP changes in the data storage system. The handling of ACP changes is also described herein, with particular reference to FIGS. 7 and 8.

Example Environment for Access Control and Encryption in Multi-User Systems

FIG. 1 is a block diagram illustrating an example environment 100 in which an encryption-zone-based access scheme 112 for encrypted information units 110 may be implemented. As illustrated, example environment 100 includes a server 102, multiple clients 104, a network 106 and encryption-zone-based access scheme 112. Server 102 includes a community access application 114, and clients 104 include individual access applications 116. Each respective client 104(1) and 104(2) is associated with a respective user 108(1) and 108(2).

Server 102 and clients 104 may communicate with each other over network 106. Network 106 may comprise one or more networks such as an intranet, an internet, the world wide web (WWW), a public or private telephone network, a Wi-Fi or WiMAX network, a cellular network, a wired or wireless network, a local area network (LAN), a wide area network (WAN), some combination thereof, and so forth. Although only a single server 102 and two clients 104 (with one user 108 apiece) are shown in example environment 100, any number of servers 102 and clients 104 (as well as users 108) may be involved in encryption-zone-based access scheme 112.

In a described implementation, encryption-zone-based access scheme 112 enables encryption-zone-based access to any number of encrypted information units (encrypted IUs) 110. Example implementations for encryption-zone-based access to encrypted information units are introduced above in the "Introduction to Access Control and Encryption in Multi-User Systems" section. Encryption-zone-based access is described in greater detail herein below in the section entitled "Example Implementations for Access Control and Encryption in Multi-User Systems".

Actual implementations for access control and encryption in multi-user systems may include any number of community access applications 114 and/or individual access applications 116. By way of example only, a given implementation for access control and encryption in multi-user systems may involve several community access applications 114 and many individual access applications 116. Alternatively, a given implementation for access control and encryption in multi-user systems may involve one individual access application 116 but no community access application 114, or vice versa.

Encrypted information units 110 may be stored anywhere, including, by way of example but not limitation, at one or more servers 102 and/or one or more clients 104. Encrypted information units 110 may include any type of data and may be organized in accordance with any given storage scheme. Example storage schemes include, by way of example but not limitation, hierarchical storage schemes, relational databases, and so forth.

Example information environments that may have such a storage scheme include, but are not limited to, the following: First, community access application 114 may be a server-side database application, and individual access application 116 may be a client-side database application. Second, community access application 114 may be a server operating system, and individual access application 116 may be a client operating system. Third, community access application 114 may be a web server application, and individual access application 116 may be a web browser application. Applications 114 and 116 may also be applications forming part of a document storage system. Hence, encrypted information units 110 may be part of a database, part of a file system of an operating system, part of a web service, part of a document storage system, some combination thereof, and so forth. Individual and community access applications 114 and 116 may also be part of a database application, part of an operating system program, part of a web application, and so forth.

Example Implementations for Access Control and Encryption in Multi-User Systems

Figure 2:
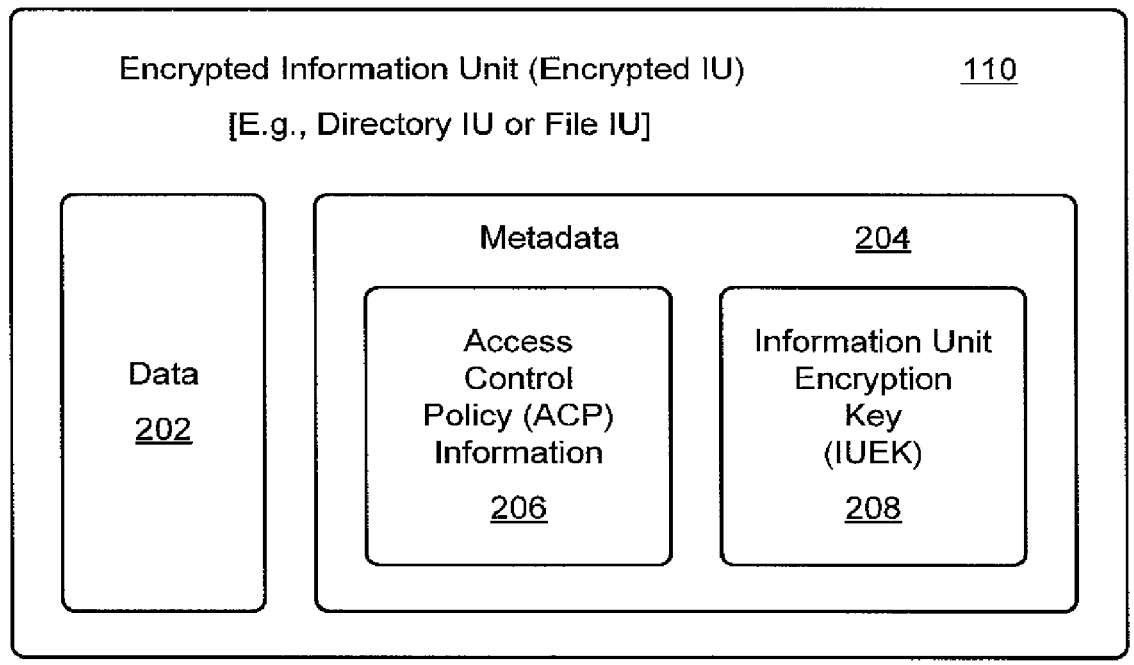
FIG. 2 is a block diagram of an example encrypted information unit having data and metadata.

FIG. 2 is a block diagram of an example encrypted information unit 110 having data 202 and metadata 204. Encrypted information unit 110 may be any type of information unit. By way of example only, each encrypted information unit 110 may be a directory information unit (e.g., a folder, a database entry, etc.) or a file information unit (e.g., a document, a spreadsheet, an email, a multimedia item, a web page, an image, a database entry, etc.). As illustrated, metadata 204 includes ACP information 206 and an information unit encryption key (IUEK) 208.

Although individual implementations may vary, certain implementations may involve encrypted information units 110 that are divided into one or more data streams and/or one or more utility streams. In such implementations, data 202 may be part of a data stream, and metadata 204 may be part of a utility stream. Furthermore, ACP information 206 may be part of a first utility stream, and IUEK 208 may be part of a second utility stream.

In a described implementation for a directory encrypted information unit 110, data 202 comprises one or more other directories and/or one or more files. For a file encrypted information unit 110, on the other hand, data 202 comprises the underlying data of the file. The underlying data may be text, images, extensible markup language (XML) information, multimedia information, database information, some combination thereof, and so forth.

ACP information 206 includes the ACP information that is associated with encrypted information unit 110. As introduced above, ACP information 206 specifies which users are permitted access to encrypted information unit 110. ACP information 206 may also stipulate what types of accesses are permitted generally and/or by specific users. IUEK 208 includes at least a version of the IUEK that corresponds to encrypted information unit 110.

In a described implementation, IUEK 208 is an encrypted version of the IUEK corresponding to encrypted information unit 110. More specifically, IUEK 208 is (and encrypted information unit 110 includes) a copy of the corresponding IUEK as encrypted by the IUEK of the most-proximate previous linked node in a storage system (e.g., the immediately-higher information unit node in a hierarchical storage system). However, as is described further herein below, the zone root node, which is also an encrypted information unit 110, of each encryption zone does not locally store its corresponding IUEK 208. For zone root nodes, the IUEK is instead stored at a trusted storage.

Figure 3:
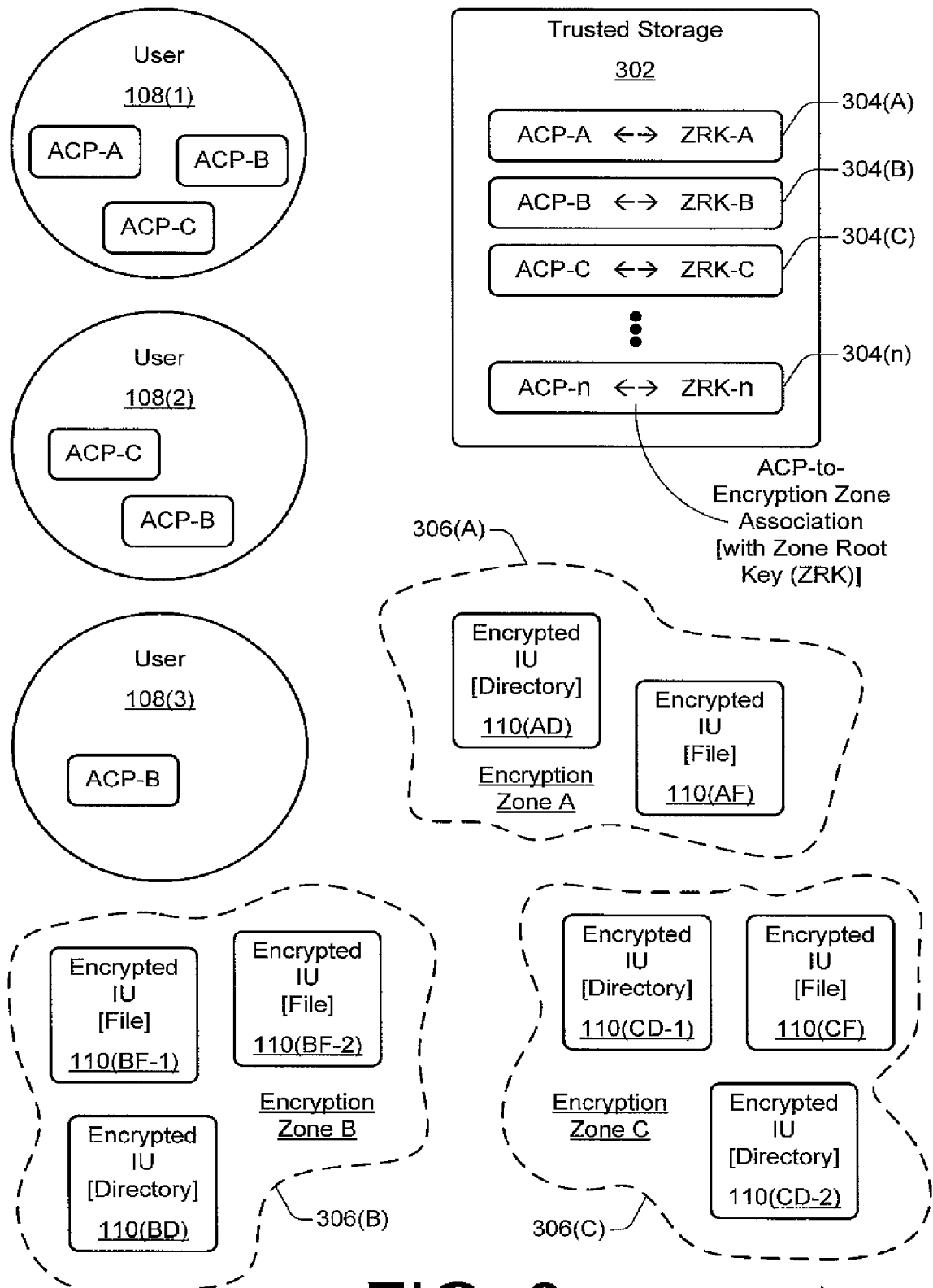
FIG. 3 is a block diagram illustrating an example of an encryption-zone-based access scheme for encrypted information units having associated access control policies (ACPs).

FIG. 3 is a block diagram illustrating an example of an encryption-zone-based access scheme 112 for encrypted information units 110 having associated access control policies (ACPs). As illustrated, encryption-zone-based access scheme 112 includes: three users 108(1), 108(2), and 108(3); three encryption zones 306(A), 306(B), and 306(C); and a trusted storage 302.

There are three possible ACPs in this example: "ACP-A", "ACP-B", and "ACP-C". User 108(1) belongs to ACP-A, ACP-B, and ACP-C. User 108(2) belongs to ACP-B and ACP-C. User 108(3) belongs to ACP-B.

In a described implementation, each encryption zone 306 is an area of a storage system in which the ACP is the same. In other words, each encryption zone 306 is a group of encrypted information units 110 that are associated with a common ACP. Hence, each encrypted information unit 110 that is a member of encryption zone A 306(A) is associated with ACP-A. Each encrypted information unit 110 that is a member of encryption zone B 306(B) is associated with ACP-B. Each encrypted information unit 110 that is a member of encryption zone C 306(C) is associated with ACP-C.

Eight encrypted information units 110 are shown in encryption-zone-based access scheme 112. Each encrypted information unit 110 is designated as encrypted information unit 110(XY), with "X" denoting the associated ACP and "Y" denoting whether it is a file (F) or a directory (D) information unit. Encryption zone A 306(A) includes a directory encrypted information unit 110(AD) and a file encrypted information unit 110(AF). Encryption zone B 306(B) includes a first file encrypted information unit 110(BF-1), a second file encrypted information unit 110(BF-2), and a directory encrypted information unit 110(BD). Encryption zone C 306(C) includes a first directory encrypted information unit 110(CD-1), a second directory encrypted information unit 110(CD-2), and a file encrypted information unit 110(CF).

In a described implementation, trusted storage 302 stores multiple associations 304. Each association 304 comprises an ACP-to-encryption zone association and includes a zone root key (ZRK). From one perspective, a ZRK is analogous to a group symmetric key with the group being defined by (e.g., being users that belong to) the ACP. Hence, encryption-zone-based access scheme 112 provides respective symmetric keys (e.g., respective ZRKs) for respective ACPs. ZRKs are described further herein below with particular reference to FIGS. 4-6. Trusted storage 302 may be located at a server 102, a client 104, a third-party device, some combination thereof, and so forth. Although only a single trusted storage 302 is shown in FIG. 3, an encryption-zone-based access scheme 112 may alternatively implement multiple such trusted storages 302.

As illustrated, trusted storage 302 includes "n" association entries 304. These "n" association entries are: association 304(A), association 304(B), association 304 (C) . . . association 304(n). Association entry 304(A) associates ACP-A with ZRK-A, which is the ZRK of encryption zone A 306(A). Association entry 304(B) associates ACP-B with ZRK-B, which is the ZRK of encryption zone B 306(B). Association entry 304(C) associates ACP-C with ZRK-C, which is the ZRK of encryption zone C 306(C). Association entry 304(n) associates ACP-n with ZRK-n.

When a properly-authenticated user 108 provides trusted storage 302 with an ACP, trusted storage 302 returns the associated ZRK to the properly-authenticated user 108. Authentication may be implemented using any of many possible authentication schemes. Examples include, but are not limited to, an identification/password authentication scheme, a so-called strong authentication scheme using public-private key cryptography, and so forth. Example implementations for trusted storage 302 include, but are not limited to, a public key infrastructure, an authenticated server, an authenticated portion of a client, an actual key store, some combination thereof, and so forth. By way of example only, a trusted storage 302 may be realized using a MICROSOFT® ACTIVE DIRECTORY® product.

A trusted storage 302 may be utilized because, for example, it can typically be made more secure than general file system components, general database components, and so forth. The usual ACP file system constraints for access to given information units are still enforced by the file system components. Accordingly, trusted storage 302 need not store all of the specifics of a given ACP. Instead, trusted storage 302 may store only who has the right to retrieve the ZRK for a given ACP (e.g., those users 108 that are included in the ACP) without knowing, for example, what access rights each user 108 may have. Trusted storage 302 may also store which user(s) 108 are sufficiently privileged so as to be permitted to change who is a member of a given ACP so that an association entry 304 may be updated upon changes to the given ACP.

In a described implementation, several characteristics of example encryption-zone-based access scheme 112 are maintained. First, there is a one-to-one correspondence between each ACP and each ZRK for each encryption zone 306. Second, this one-to-one correspondence is reflected in the association entries 304 of trusted storage 302. Third, each file encrypted information unit 110 and each directory encrypted information unit 110 is a member of one and only one encryption zone 306 at any given single moment.

As illustrated in the example encryption-zone-based access scheme 112 of FIG. 3, user 108(1) belongs to ACP-A, ACP-B, and ACP-C. Consequently, user 108(1) can access those encrypted information units 110 that are members of encryption zone A 306(A), encryption zone B 306(B), and encryption zone C 306(C). Similarly, user 108(2) belongs to ACP-B and ACP-C. Consequently, user 108(2) can access those encrypted information units 110 that are members of encryption zone B 306(B) and encryption zone C 306(C). User 108(3) belongs to ACP-B. Consequently, user 108(3) can access those encrypted information units 110 that are members of encryption zone B 306(B).

In example operations of encryption-zone-based access scheme 112, it is given that user 108(2) is attempting to access encrypted information units 110. For a first example access attempt, user 108(2) wishes to access file encrypted information unit 110(CF), which is associated with ACP-C. File encrypted information unit 110(CF) is a member of encryption zone C 306(C). User 108(2) identifies ACP-C to trusted storage 302. After appropriate authentication, trusted storage 302 returns ZRK-C to user 108(2) because user 108(2) belongs to ACP-C and because ZRK-C is associated with ACP-C as indicated by association entry 304(C). User 108(2) is then able to access file encrypted information unit 110(CF) using ZRK-C. This access scheme involves the traversal of an encryption key chain, which is described further herein below with particular reference to FIGS. 4-6.

For a second example access attempt, user 108(2) wishes to access file encrypted information unit 110 (AF), which is associated with ACP-A. File encrypted information unit 110 (AF) is a member of encryption zone A 306(A). User 108(2) identifies ACP-A to trusted storage 302. Even after appropriate authentication (if any is performed), trusted storage 302 does not return ZRK-A to user 108(2) because user 108(2) does not belong to ACP-A. In other words, user 108(2) is absent from the list of users 108 in association entry 304(A). The attempt by user 108(2) to retrieve ZRK-A fails. User 108(2) is therefore unable to access file encrypted information unit 110(AF).

Figure 4:
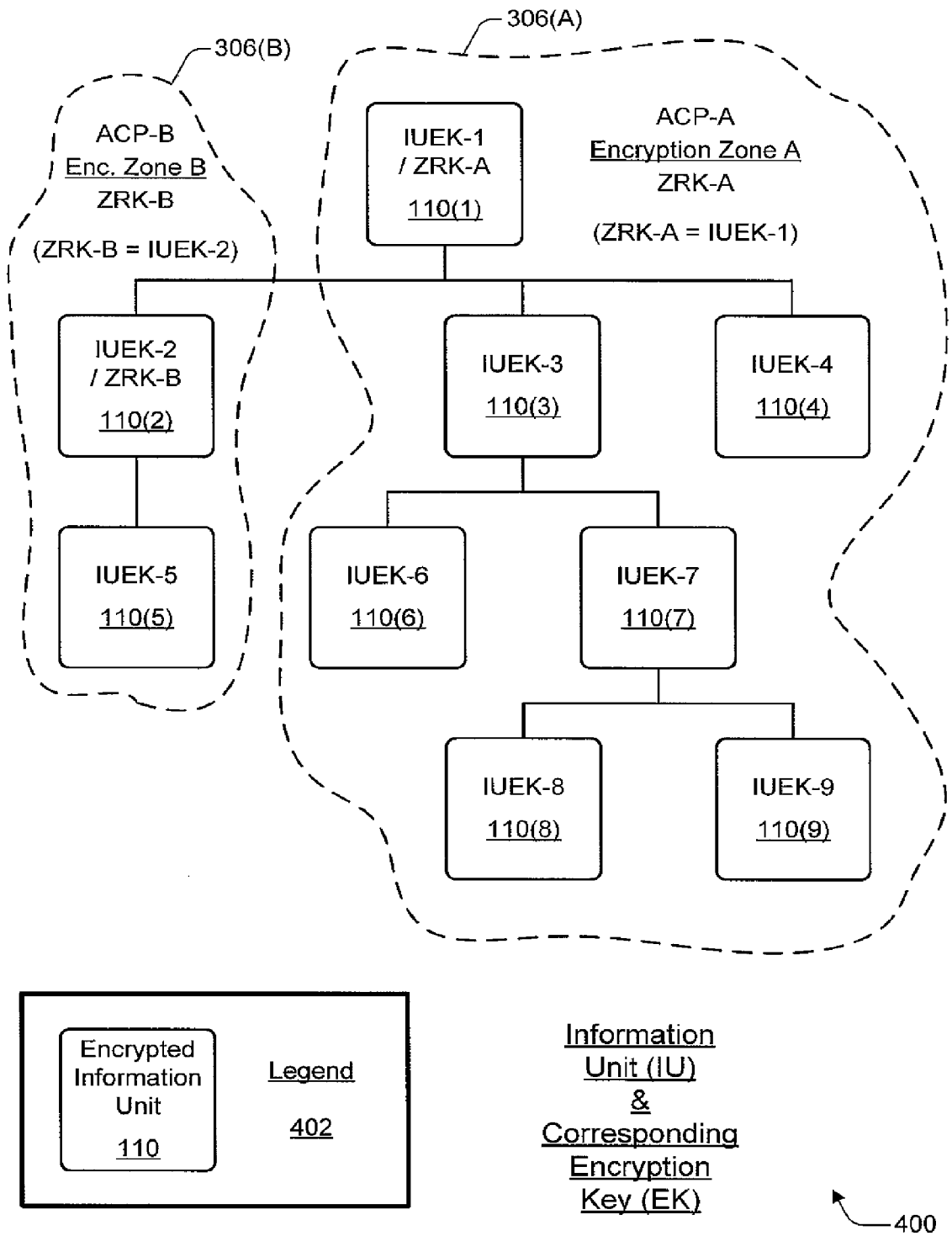
FIG. 4 is a block diagram of an example storage system in which encrypted information units having corresponding encryption keys are grouped into encryption zones.

FIG. 4 is a block diagram of an example storage system 400 in which encrypted information units 110 having corresponding encryption keys are grouped into encryption zones 306. As indicated by legend 402, each encrypted information unit 110 is represented in storage system 400 by a square. As illustrated, there are nine encrypted information units 110(1)-110(9). Also illustrated are two encryption zones 306(A) and 306(B).

In a described implementation, each encrypted information unit 110 corresponds to an IUEK. Specifically, encrypted information unit 110(1) corresponds to IUEK-1, encrypted information unit 110(2) corresponds to IUEK-2, encrypted information unit 110(3) corresponds to IUEK-3, encrypted information unit 110(4) corresponds to IUEK-4, encrypted information unit 110(5) corresponds to IUEK-5, encrypted information unit 110(6) corresponds to IUEK-6, encrypted information unit 110(7) corresponds to IUEK-7, encrypted information unit 110(8) corresponds to IUEK-8, and encrypted information unit 110(9) corresponds to IUEK-9.

Example linking relationships between and among encrypted information units 110 of storage system 400 are graphically illustrated in FIG. 4. As noted above, storage system 400 may be any type of storage system, such as a file system, a database, some combination thereof, and so forth. In a described implementation that utilizes an encryption key chain, encrypted information units 110 are linked in some manner. The linking may be for a file system (e.g., and be based on a hierarchical scheme), a database (e.g., and be based on a relational scheme), and so forth. A linked grouping of encrypted information units 110 may include branches, as shown in FIG. 4.

Each ACP-based grouping of encrypted information units 110 forms an encryption zone 306. Each encryption zone 306 includes at least one zone root node that is the initial (e.g., the highest, the most prominent, the entry-point, etch) node in the linked grouping of encrypted information units 110 of the encryption zone 306. With the exception of the zone root key, each IUEK 208 is encrypted with the IUEK 208 corresponding to the most-proximate previous linked node in the storage system (e.g., corresponding to the immediately-higher node in a hierarchical storage system). A file information unit, which directly includes user data (e.g., encrypted information unit 110(9)), that is located at a terminating node of a linked chain of nodes in a storage system (e.g., that is located at the lower-most node of a branch of a hierarchical storage system) has its user data encrypted with its corresponding IUEK 208.

Generally, the linked nodes of encrypted information units 110 may be thought of as having parent-child relationships. Hence, by way of example only, encrypted information unit 110(3) is a parent node of two child nodes: encrypted information unit 110(6) and encrypted information unit 110(7). Using the terminology of a hierarchical storage system, encrypted information unit 110(3) is an immediately-higher node of either (and both of) encrypted information unit 110(6) and encrypted information unit 110(7).

In a described implementation, automatic association of user privileges for newly-created information units 110 (e.g., such as an inheritance scheme in the parlance of hierarchical storage systems) is enabled for the encrypted aspects as well as the ACP aspects of storage system 400. For example, encryption attributes, as well as ACP attributes, of a parent folder may be applied to child folders. Moreover, an encrypted file that is dropped into a folder may be made accessible (including decryptable) by users that have been given access to that folder. For the purpose of providing a more concrete example to better understand the general concepts described herein, storage system 400 may be considered a hierarchical storage system that implements inheritance for its information units 110.

Encryption zone A 306(A) is associated with ACP-A and corresponds to ZRK-A. As illustrated, encryption zone A 306(A) includes seven encrypted information units 110(1), 110(3), 110(4), 110(6), 110(7), 110(8), and 110(9). Each of these seven encrypted information units 110 is individually associated with ACP-A. Encrypted information unit 110(1) is the initial node (e.g., the highest node from a hierarchical perspective) in encryption zone A 306(A). Consequently, encrypted information unit 110(1) is the zone root node of encryption zone A 306(A). The IUEK of the zone root node for a given encryption zone is the zone root key (ZRK) for the given encryption zone. Hence, IUEK-1 is ZRK-A, which is the ZRK for encryption zone A 306(A).

Encryption zone B 306(B) is associated with ACP-B and corresponds to ZRK-B. As illustrated, encryption zone B 306(B) includes two encrypted information units 110(2) and 110(5). Each of these two encrypted information units 110 is individually associated with ACP-B. Encrypted information unit 110(2) is the initial node in encryption zone B 306(B). Consequently, encrypted information unit 110(2) is the zone root node of encryption zone B 306(B). Hence, IUEK-2 is ZRK-B, which is the ZRK for encryption zone B 306(B).

Figure 5:
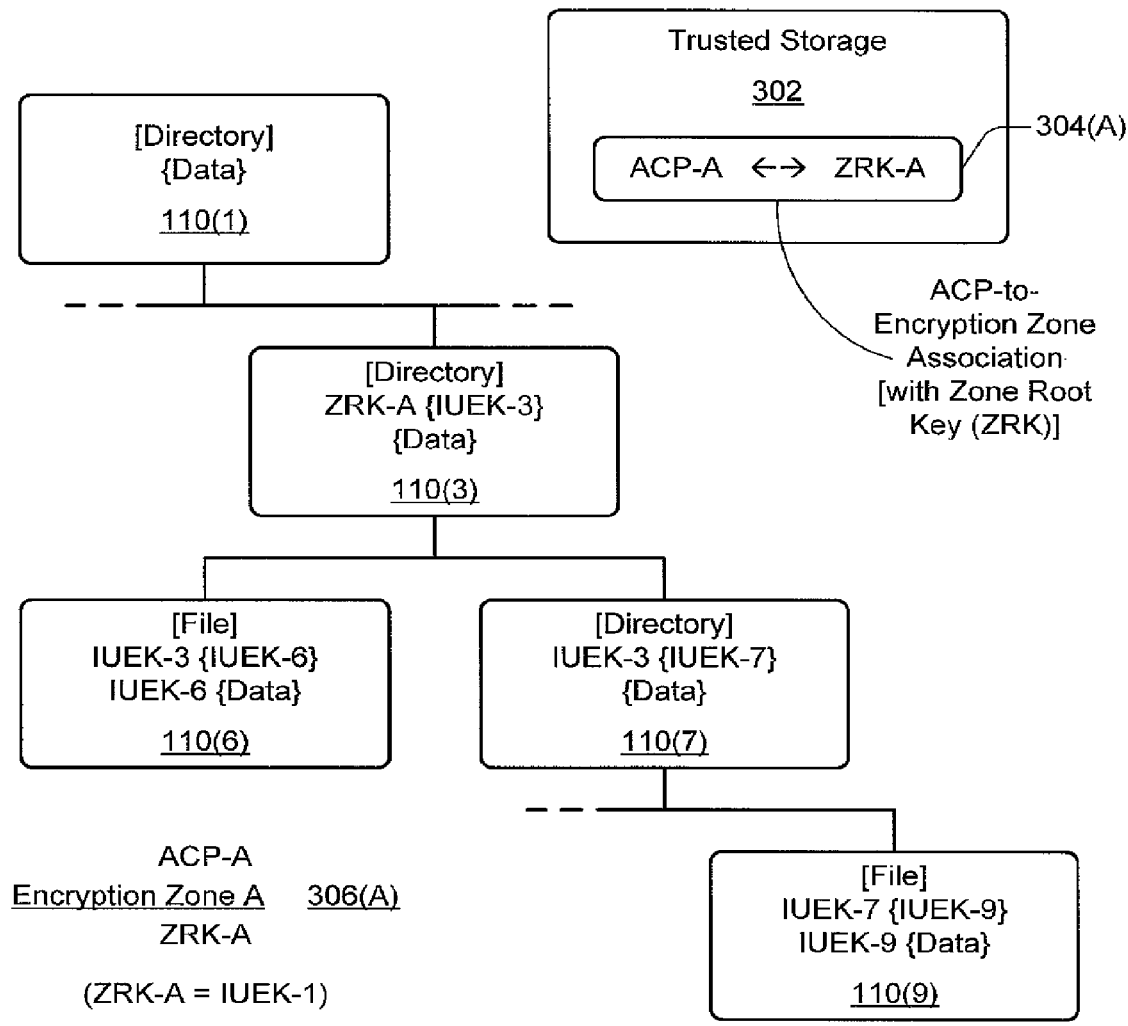
FIG. 5 is a block diagram illustrating encrypted information units and examples of their included metadata and data.
Figure 5:
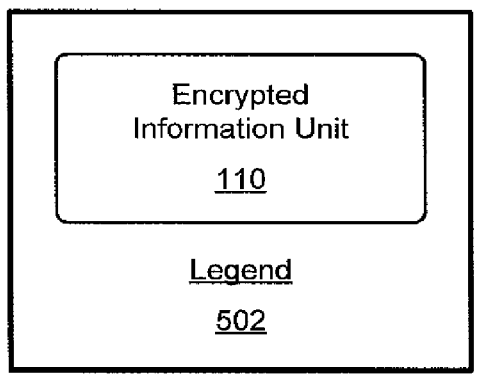

FIG. 5 is a block diagram 500 illustrating encrypted information units 110 and examples of their included metadata and data. As indicated by legend 502, each encrypted information unit 110 is represented in block diagram 500 by a rectangle. Block diagram 500 includes trusted storage 302 and part of encryption zone A 306(A). Trusted storage 302 includes the relevant association entry 304, which is association entry 304(A). Association entry 304(A) associates ACP-A with ZRK-A.

The illustrated part of encryption zone A 306(A) includes five encrypted information units 110(1), 110(3), 110(6), 110(7), and 110(9). In this example, encrypted information units 110(1), 110(3), and 110(7) are directory encrypted information units. Encrypted information units 110(6) and 110(9) are file encrypted information units.

The encrypted information unit 110 that is illustrated in FIG. 2 shows data 202 and metadata 204 having IUEK 208. Block diagram 500 illustrates which encrypted information units 110 have data 202 and an IUEK 208. (ACP information 206 is not shown in FIG. 5 for clarity.) Each encrypted information unit 110 includes data (as represented in block diagram 500 by "{Data}"). With the exception of the zone root node of encrypted information unit 110(1), each other encrypted information unit 110 includes a copy of its corresponding IUEK as encrypted by the IUEK corresponding to its parent encrypted information unit 110, which occupies the most-proximate previous linked node in the storage system, (e.g., the immediately-higher node in a hierarchical storage system).

These encryption key relationships are represented in block diagram 500 by "IUEK-W{IUEK-Z}", where "W" indicates the parent node and "Z" indicates the corresponding node. Thus, IUEK-W{IUEK-Z} implies that an information unit encryption key corresponding to node Z is encrypted by an information unit encryption key corresponding to node W.

Encrypted information unit 110(1) includes {Data}. It does not include a copy of its corresponding encryption key, IUEK-1=ZRK-A. Instead, ZRK-A is located at trusted storage 302 in association entry 304(A). The {Data} of encrypted information unit 110(1) is one or more other files and directories, such as directory encrypted information unit 1110(3).

Encrypted information unit 110(3) includes {Data} and a copy of IUEK-3 as encrypted by ZRK-A, which is also IUEK-1. This is indicated by "ZRK-A{IUEK-3}". The {Data} of encrypted information unit 110(3) is one or more other files and directories, such as file encrypted information unit 110(6) and directory encrypted information unit 110(7). Encrypted information unit 110(6) includes encrypted {Data} and a copy of IUEK-6 as encrypted by IUEK-3, which is the information unit encryption key corresponding to the most-proximate previous linked node. The {Data} of encrypted information unit 110(6) is encrypted by IUEK-6.

Encrypted information unit 110(7) includes {Data} and a copy of IUEK-7 as encrypted by IUEK-3 ("IUEK-3 {IUEK-7}"). The {Data} of encrypted information unit 110(7) is one or more other files and directories, such as file encrypted information unit 110(9). Encrypted information unit 110(9) includes encrypted {Data} and a copy of IUEK-9 as encrypted by IUEK-7, which is the encryption key corresponding to the parent node. This is indicated by "IUEK-7{IUEK-9}". The {Data} of encrypted information unit 110(9) is encrypted by IUEK-9. This is indicated by "IUEK-9{Data}".

Accessing the {Data} of encrypted information unit 110(9) entails traversing an encryption key chain including "IUEK-7 {IUEK-9}", "IUEK-3 (IUEK-7)", and "ZRK-A{IUEK-3}", in addition to retrieving ZRK-A from trusted storage 302. This enables the ultimate decryption of the {Data} of encrypted information unit 110(9). An example encryption key chain traversal is described below with particular reference to FIG. 6.

Figure 6:
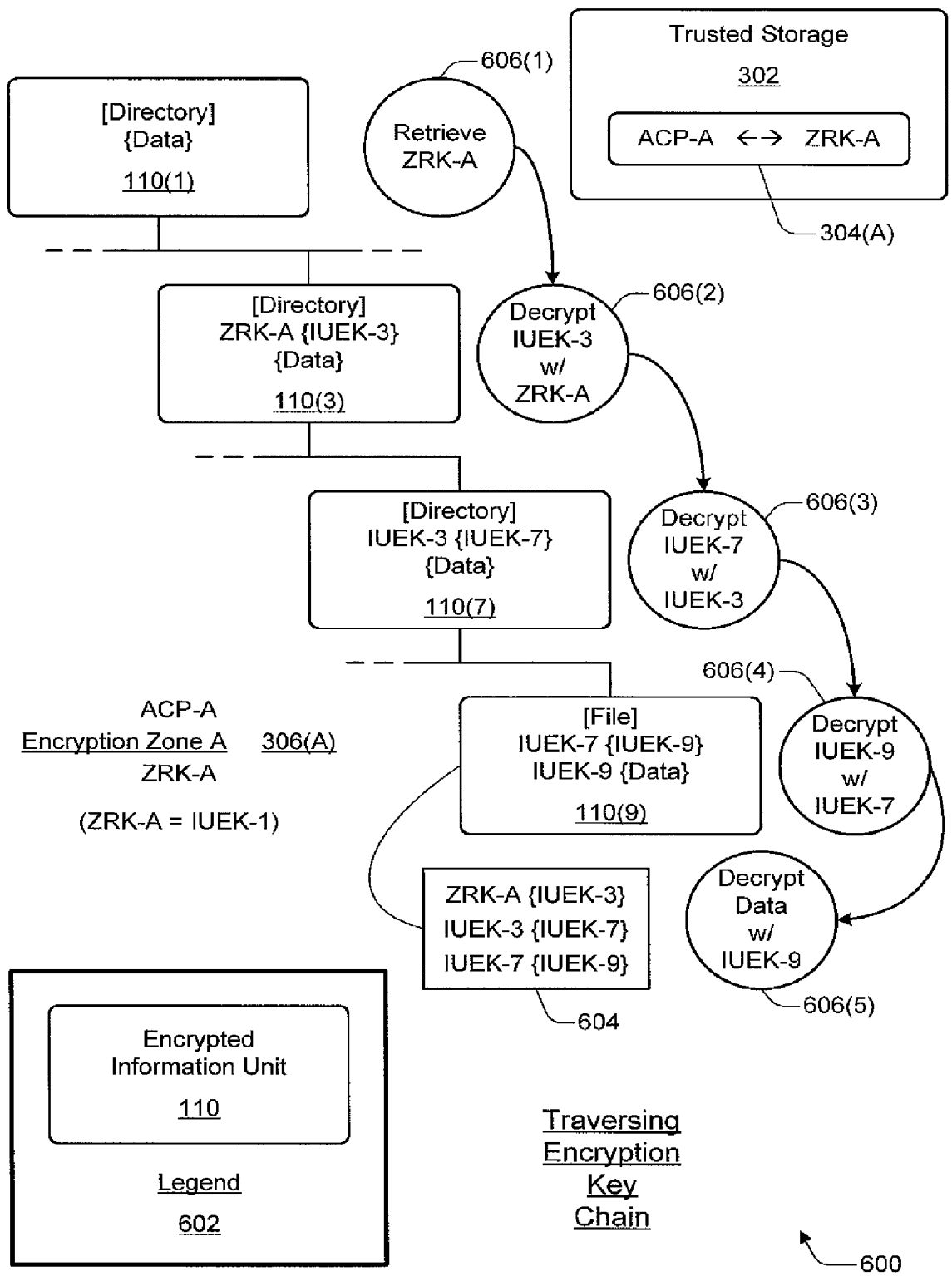
FIG. 6 is a block diagram illustrating an example traversal of an encryption key chain to access an encrypted information unit.

FIG. 6 is a block diagram 600 illustrating an example traversal of an encryption key chain 604 to access an encrypted information unit 110(9). As indicated by legend 602, each encrypted information unit 110 is represented in block diagram 600 by a rectangle. Block diagram 600 includes trusted storage 302 and part of encryption zone A 306(A). Encryption zone A 306(A) and trusted storage 302 as illustrated in block diagram 600 are identical to their illustrations in block diagram 500 (of FIG. 5), except that encrypted information unit 110(6) has been omitted for clarity.

In a described implementation, encryption key chain 604 includes "ZRK-A{IUEK-3}", "IUEK-3 {IUEK-7}", and "IUEK-7 {IUEK-9}". Traversing encryption key chain 604 enables access to encrypted information unit 110(9) by unpacking IUEK-9, which may be used to decrypt the {Data} of encrypted information unit 110(9). In certain implementations, all or part of one or more of the encryption key chains may be stored in a lower directory (e.g., in a deeply-nested folder) at or near the relevant information unit for performance reasons.

An access operation 606 to access encrypted information unit 110(9) is shown. In effect, traversing encryption key chain 604 is akin to unpacking the encrypted keys to derive IUEK-9, which can be used to decrypt the {Data} of encrypted information unit 110(9). Access operation 606 includes five sub-operations 606(1)-606(5). In a first sub-operation 606(1), ZRK-A is retrieved from trusted storage 302. The ZRK-A retrieval sub-operation 606(1) is performed by an appropriately-authenticated user that belongs to ACP-A and that identifies or references ACP-A to trusted storage 302.

Encryption key chain 604 is traversed in sub-operations 606(2)-606(4). Sub-operations 606(2) and 606(3) decrypt intermediate IUEKs. In sub-operation 606(2), IUEK-3 is decrypted with the retrieved ZRK-A. IUEK-7 is then decrypted in sub-operation 606(3) using the just-decrypted IUEK-3. Sub-operation 606(4) entails decrypting IUEK-9 with IUEK-7. After IUEK-9 has been decrypted, the {Data} of encrypted information unit 110(9) is decrypted with IUEK-9 in sub-operation 606(5). After decrypting the {Data} of encrypted information unit 110(9), the requesting user may access it normally, subject to any ACP-A-related restrictions. When a new file, a new sub-folder, or a new set of sub-folders is created, all or part of a new encryption key chain may be built using an inverse process.

Figure 7:
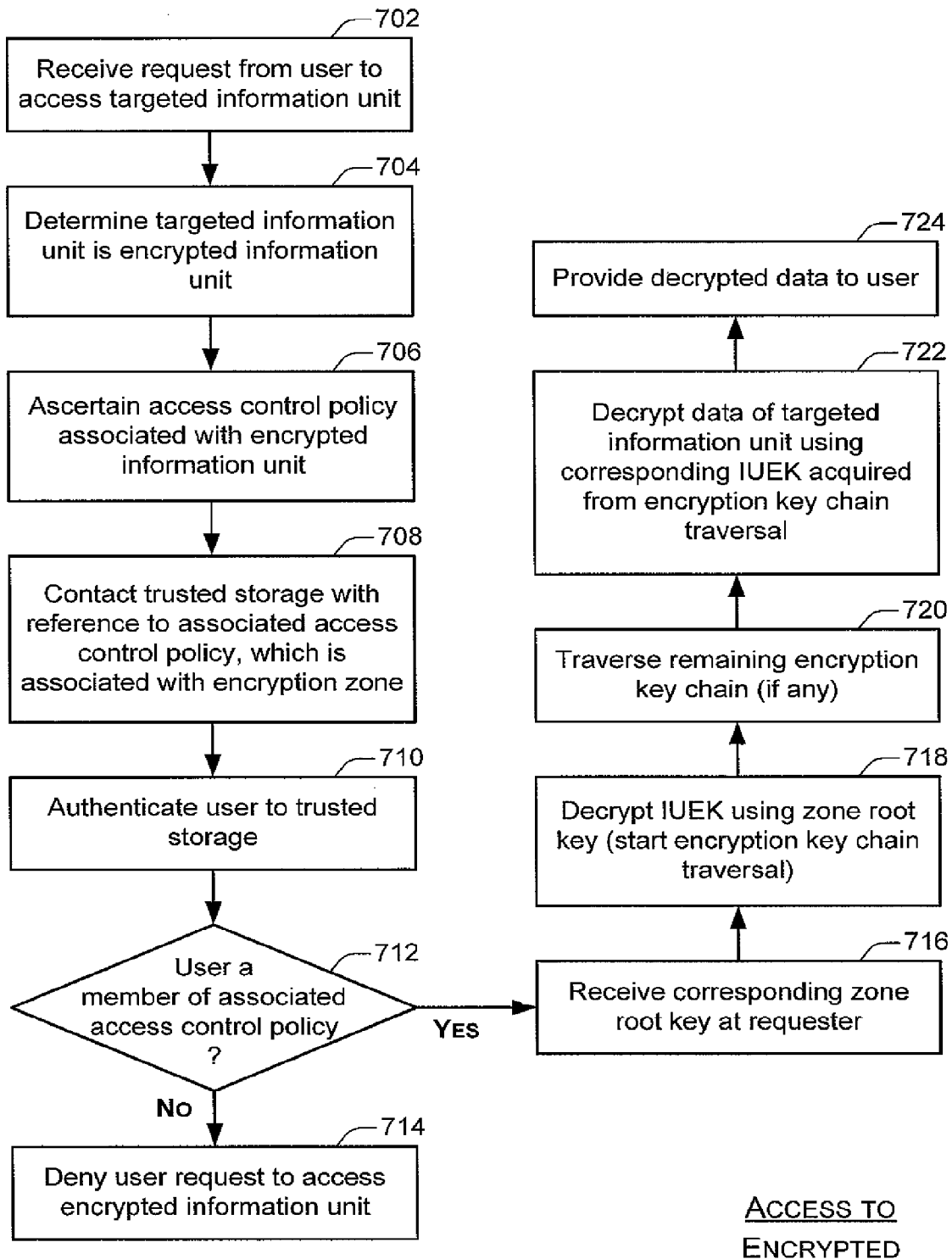
FIG. 7 is a flow diagram that illustrates an example of a method for accessing an encrypted information unit.

FIG. 7 is a flow diagram 700 that illustrates an example of a method for accessing an encrypted information unit. Flow diagram 700 includes twelve (12) blocks 702-724. Although the actions of flow diagram 700 may be performed in other environments and with a variety of hardware and software combinations, environment 100 (of FIG. 1) and the example storage system instance of FIGS. 4-6 are used to illustrate an example of the method of flow diagram 700.

At block 702, a request from user to access a targeted information unit is received. For example, a request from a user 108(1) to access encrypted information unit 110(9) may be received at an application 114/116. At block 704, it is determined that the targeted information unit is an encrypted information unit.

At block 706, the ACP that is associated with the encrypted information unit is ascertained. For example, it may be ascertained that ACP-A is associated with encrypted information unit 110(9).

At block 708, a trusted storage is contacted with reference to the associated ACP, which is also associated with the encryption zone of which the targeted information unit is a member. For example, trusted storage 302 may be contacted, and ACP-A may be identified. ACP-A is also associated with encryption zone A 306(A), which includes among is members encrypted information unit 110(9).

At block 710, the user is authenticated to the trusted storage. For example, user 108(1) may be authenticated to trusted storage 302. If authentication is successful, then at block 712 it is determined if the user belongs to the associated ACP. For example, it may be determined by trusted storage 302 if user 108(1) belongs to ACP-A.

If not, then at block 714, the user request to access the encrypted information unit is denied. In other words, trusted storage 302 may decline to return the corresponding ZRK. However, in this example, the user (user 108(1)) does belong to the identified ACP (ACP-A). The trusted storage (trusted storage 302) therefore sends the ZRK (ZRK-A) that is associated with the identified ACP (ACP-A) to the requesting user (user 108(1)). At block 716, the requester receives the corresponding ZRK. For example, user 108(1) may receive (e.g., via individual access application 116) ZRK-A, which corresponds to encryption zone A 306(A).

At block 718, an IUEK is decrypted using the received ZRK, which starts the encryption key chain traversal. For example, IUEK-3 may be decrypted using ZRK-A. If encrypted information unit 110(3) were a file and the targeted information unit, the data thereof could be decrypted using IUEK-3. However, in this example, there are additional links of the encryption key chain that are still to be traversed.

At block 720, the remaining encryption key chain is traversed. For example, the remaining links of encryption key chain 604 may be traversed. In this example, IUEK-7 is decrypted with IUEK-3, and IUEK-9 is decrypted with IUEK-7.

At block 722, the data of the targeted information unit is decrypted using its corresponding IUEK that is acquired from the encryption key chain traversal. For example, data 202 of encrypted information unit 110(9) may be decrypted using IUEK-9, which is derived by traversing encryption key chain 604. At block 724, the decrypted data is provided to the user. For example, decrypted data 202 may be provided to user 108(1) at client 104(1).

In a described implementation, encryption-zone-based access scheme 112 (e.g., via community access application 114 and/or individual access application 116) entails automatically handling storage system operations. Thus, while users can directly manage ACPs, the keys and the other encryption aspects are automatically handled behind the scenes by the system without needing direct manual input from users. In other words, an example implementation of encryption-zone-based access scheme 112 entails automatically updating information at trusted storage 302 and/or updating encryption key chains 604, as well as any encrypted data, when storage system access operations are conducted by users. The storage system may be a file system, a database system, some combination thereof, and so forth.

Example storage system access operations include, but are not limited to, [1] read/write, [2] create, [3] delete, [4] move, [5] backup/restore, and [6] ACP modifications.

With regard to [1] read/write access operations, the encryption aspects of both reads and writes are the same. A ZRK that is associated with the ACP that is associated with the targeted encrypted information unit 110 is retrieved and used to traverse an encryption key chain to derive an IUEK. The IUEK corresponds to the targeted encrypted information unit 110 and is used to decrypt the data thereof. The data is then presented to the user, who may read from it and/or write to it (if ACP stipulations so permit). When the reading and/or writing is completed (e.g., when the file is closed), the data of the file (at least if there are changes to the data) is re-encrypted using the corresponding IUEK. If the encrypted copy of the corresponding IUEK is not readily available (e.g., if it was not retained from the encryption key chain traversal), then the IUEK is re-encrypted using the IUEK of the parent node prior to its storage in metadata 204 of encrypted information unit 110.

With regard to [2] creation access operations, they occur when a new information unit 110 is created that is to be encrypted. Two examples are described below: (i) a file that is created within one or more folders and (ii) a directory that is created at an initial node of a linked grouping (e.g., at the top of a hierarchy). If (i) the new encrypted information unit 110 is a file within one or more folders, then the data of the new file is encrypted with a new IUEK that is to correspond to the new file. The corresponding IUEK is encrypted with the IUEK of the directory at, e.g., the immediately-higher level in a hierarchical storage system. This may entail traversing an encryption key chain to first derive the unencrypted version of the IUEK of the immediately-higher level.

If (ii) the new encrypted information unit 110 is a directory at the top of a new sub-hierarchy of a new encryption zone, the encrypted information unit 110 constitutes a new zone root node of a new encryption zone 306. A new IUEK is created that constitutes the ZRK of the new encryption zone 306. The ZRK is therefore provided to trusted storage 302 to be stored in an association entry 304 with the new ACP that is associated with the new encryption zone 306 as well as the new encrypted information unit 110.

With regard to [3] deletion access operations, a deleted encrypted information unit 110 may be a "standard" encrypted information unit 110 or a zone root node. For standard encrypted information unit 110, deleted encrypted information units 110 are merely deleted. There are no additional encryption-related sub-operations. For a zone root node, on the other hand, when the encrypted information unit 110 is deleted, trusted storage 302 is contacted. Trusted storage 302 is requested to unpublish the association entry 304 that is associated with the encryption zone 306 for which the deleted encrypted information unit 110 was formerly the zone root node.

With regard to [4] move access operations, they can be separated into (i) moves within an encryption zone 306 and (ii) moves between two different encryption zones 306. With (i) an intra-encryption zone move, trusted storage 302 is contacted once to retrieve the ZRK of the encryption zone. The encryption key chain leading to the origin location of the encrypted information unit 110 is then traversed to ultimately decrypt the IUEK corresponding thereto. The encryption key chain leading to the destination location for the encrypted information unit 110 is then traversed to ultimately re-encrypt the corresponding IUEK of the moved encrypted information unit 110 with the IUEK corresponding to the encrypted information unit 110 of the new most-proximate previous linked node. With (ii) an inter-encryption zone move, the move may be separated into a delete operation and a create operation, which are both described above.

With regard to [5] backup/restore access operations, the storage system may be backed up in its encrypted state with its encryption key chains in effect. The associations 304 are maintained at trusted storage 302 or at another (e.g., backed up) location. After restoration, the storage system may be accessed as described herein.

With regard to [6] ACP modification accesses, there are three major scenarios. First, there may be a change to an ACP such that all objects with that ACP now have a new ACP. For example, a user may be added to an ACP. Second, two ACPs may be merged when a change to one ACP makes it the same as another ACP in the system. Third, an ACP may be split and created from another ACP when a change to a given ACP portion creates another unique ACP in the system. These three scenarios are described below with particular reference to FIG. 8.

Figure 8:
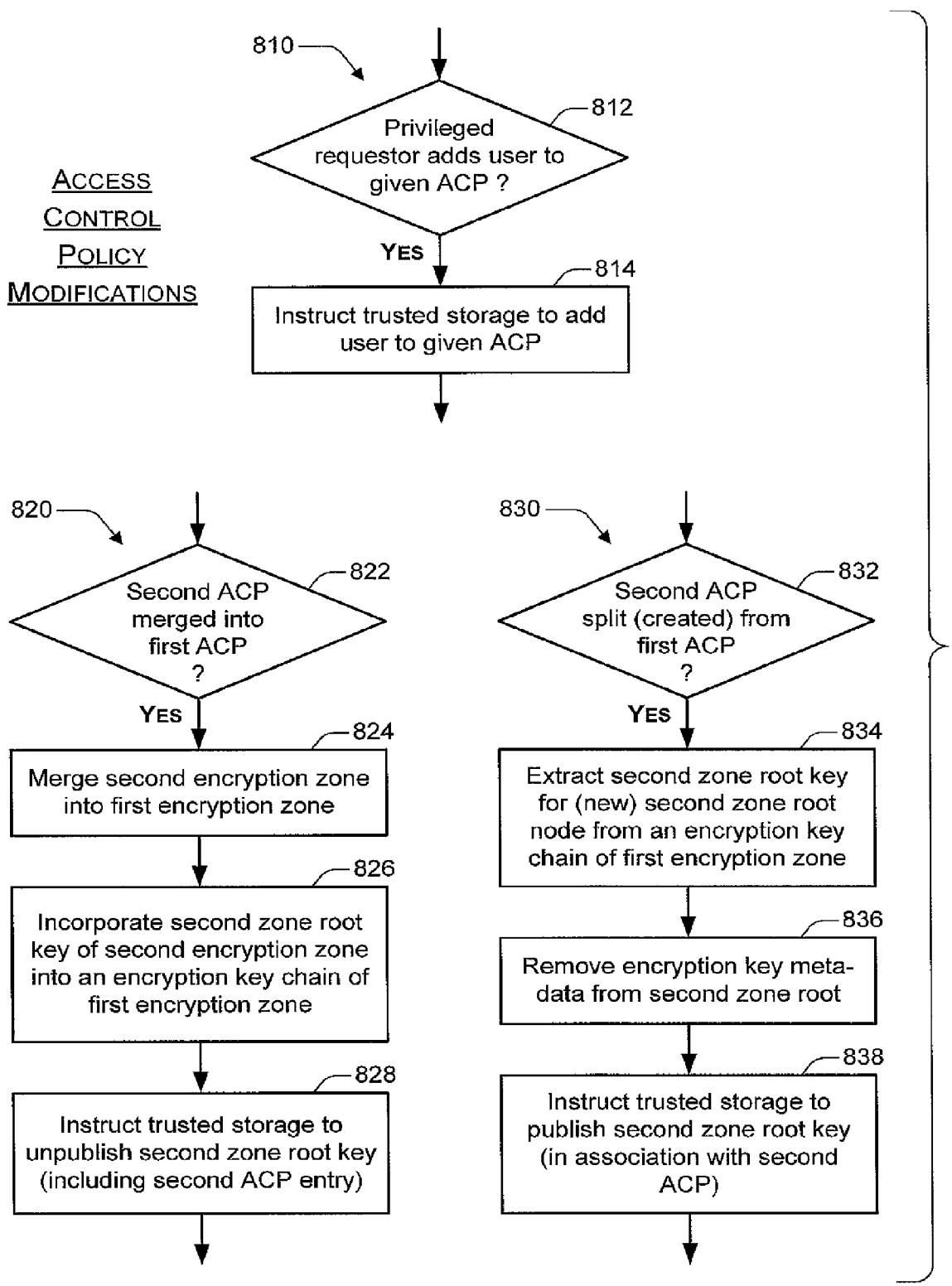
FIG. 8 is a set of flow diagrams that illustrate examples of handling modifications to ACPs in conjunction with access control and encryption in multi-user systems.

FIG. 8 is a set of flow diagrams 810, 820, and 830 that illustrate examples of handling modifications to ACPs in conjunction with access control and encryption in multi-user systems. Although the actions of the flow diagrams of FIG. 8 may be performed in other environments and with a variety of hardware and software combinations, environment 100 (of FIG. 1) and the example storage system instance of FIGS. 4-6 are used to illustrate examples.

Flow diagram 810 illustrates the addition of a user to an ACP. Flow diagram 810 includes two (2) blocks 812 and 814. At block 812, it is determined if a privileged requestor is attempting to add a user to a given ACP. If so, then at block 814 the trusted storage is instructed to add the user to the given ACP. Thereafter, the added user may retrieve the ZRK that is associated with the given ACP. Another example of the first major scenario is the deletion of a user from an ACP. These and other such changes to ACPs involve changing the corresponding ACP-to-encryption zone association entry 304.

Flow diagram 820 illustrates the merging of two ACPs. Flow diagram 820 includes four (4) blocks 822-828. At block 822, it is determined if a second ACP is being merged into a first ACP. This may occur, for example, if encrypted information unit 110(2) (of FIG. 4) is moved into encrypted information unit 110(4), which merges encryption zone B 306(B) into encryption zone A 306(A).

If the second ACP is determined to be merging into the first ACP (at block 822), then at block 824 it is automatically determined that the associated second encryption zone is to be merged into the associated first encryption zone. At block 826, a second ZRK corresponding to the second encryption zone is incorporated into an encryption key chain of the first encryption zone. At block 828, the trusted storage is instructed to unpublish the second ZRK (including unpublishing the association entry of the second ACP).

Flow diagram 830 illustrates the splitting of one ACP from another ACP. Flow diagram 830 includes four (4) blocks 832-838. At block 832, it is determined if a second ACP is being split (or created) from a first ACP. This may occur, for example, if the ACP associated with encrypted information unit 110(7) (of FIG. 4) is altered such that it is no longer the same as ACP-A, which is associated with encryption zone A 306(A).

If the second ACP is determined to be splitting from the first ACP (at block 832), then at block 834 a second ZRK for a (new) second zone root node is extracted from an encryption key chain of a first encryption zone associated with the first ACP. At block 836, the encryption key meta-data is removed from the second zone root node of the (new) second encryption zone. At block 838, the trusted storage is instructed to publish the second ZRK in association with a second ACP that is associated with the second zone root node and with the second encryption zone.

Figure 9:
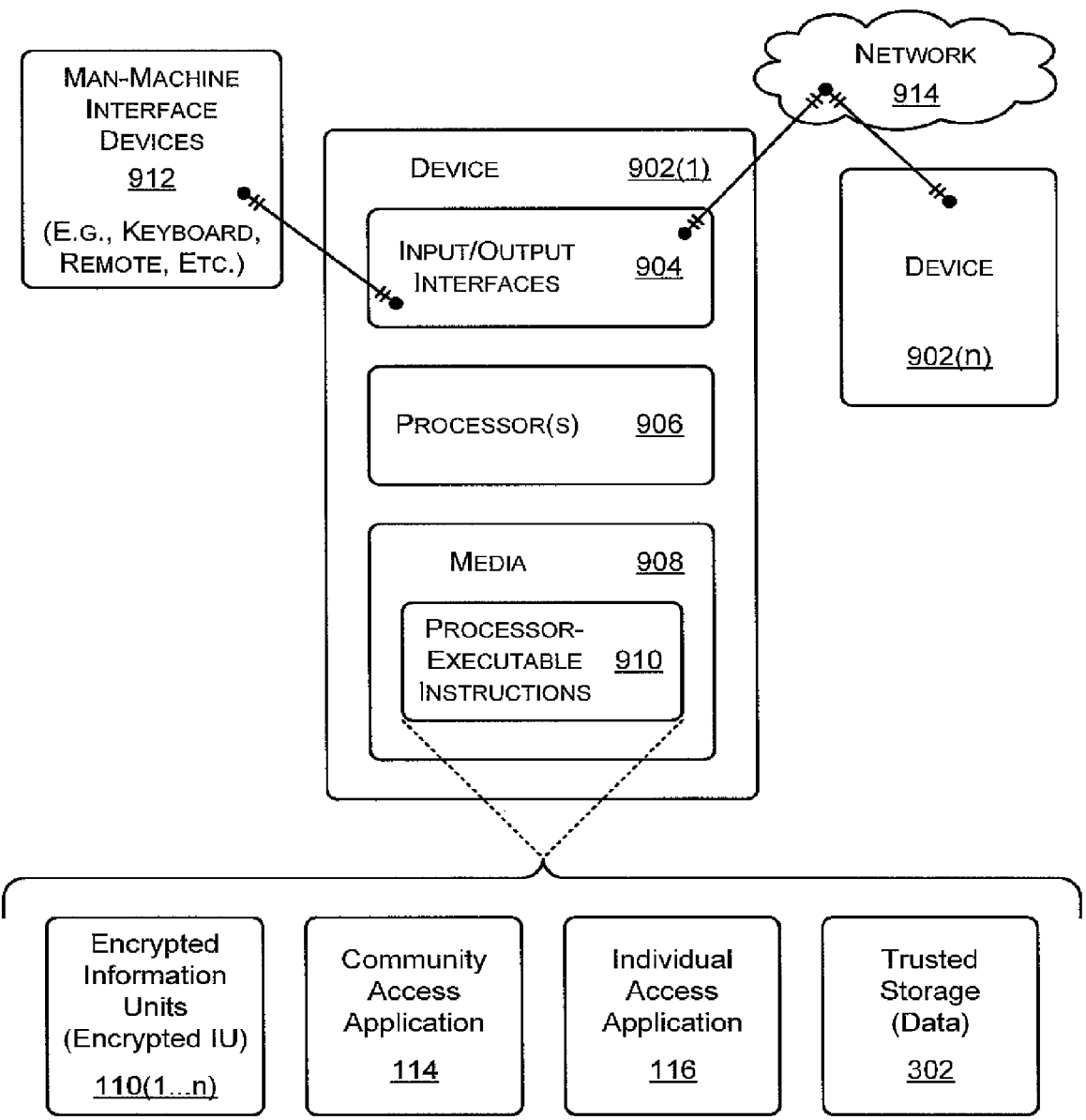
FIG. 9 is a block diagram of an example device that may be used to implement access control and encryption in multi-user systems.

FIG. 9 is a block diagram of an example device 902 that may be used to implement access control and encryption in multi-user systems. Multiple devices 902 are capable of communicating across one or more networks 914, such as a network 106 (of FIG. 1). As illustrated, two devices 902(1) and 902(n) are capable of engaging in communication exchanges via network 914. Although two devices 902 are specifically shown, one or more than two devices 902 may be employed, depending on implementation. Servers 102 and clients 104 may be realized as devices 902.

Generally, a device 902 may represent any computer or processing-capable device, such as a server device; a workstation or other general computer device; a personal digital assistant (PDA); a mobile phone; a gaming platform; an entertainment device; some combination thereof; and so forth. As illustrated, device 902 includes one or more input/output (I/O) interfaces 904, at least one processor 906, and one or more media 908. Media 908 include processor-executable instructions 910.

In a described implementation of device 902, I/O interfaces 904 may include (i) a network interface for communicating across network 914, (ii) a display device interface for displaying information on a display screen, (iii) one or more manmachine interfaces, and so forth. Examples of (i) network interfaces include a network card, a modem, one or more ports, and so forth. Examples of (ii) display device interfaces include a graphics driver, a graphics card, a hardware or software driver for a screen or monitor, and so forth. Examples of (iii) man-machine interfaces include those that communicate by wire or wirelessly to man-machine interface devices 912 (e.g., a keyboard, a remote, a mouse or other graphical pointing device, etc.).

Generally, processor 906 is capable of executing, performing, and/or otherwise effectuating processor-executable instructions, such as processor-executable instructions 910. Media 908 is comprised of one or more processor-accessible media. In other words, media 908 may include processor-executable instructions 910 that are executable by processor 906 to effectuate the performance of functions by device 902.

Thus, realizations for access control and encryption in multi-user systems may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 906 may be implemented using any applicable processing-capable technology. Media 908 may be any available media that is included as part of and/or accessible by device 902. It includes volatile and non-volatile media, removable and non-removable media, and storage and transmission media (e.g., wireless or wired communication channels). For example, media 908 may include an array of disks for longer-term mass storage of processor-executable instructions 910, random access memory (RAM) for shorter-term storing of instructions that are currently being executed, link (s) on network 914 for transmitting communications, and so forth.

As specifically illustrated, media 908 comprises at least processor-executable instructions 910. Generally, processor-executable instructions 910, when executed by processor 906, enable device 902 to perform the various functions described herein, including those actions that are illustrated in flow diagrams 700 and 810/820/830 (of FIGS. 7 and 8, respectively), those data structures illustrated in FIGS. 4-6, those schemes illustrated in FIGS. 1 and 3, and so forth. By way of example only, processor-executable instructions 910 may include encrypted information units 110(1 ... n), one or more community access applications 114, one or more individual access applications 116, a trusted storage 302 (including data structures thereof), some combination thereof, and so forth.

The devices, actions, aspects, features, functions, procedures, modules, data structures, protocols, models, components, etc. of FIGS. 1-9 are illustrated in diagrams that are divided into multiple blocks. However, the order, interconnections, interrelationships, layout, etc. in which FIGS. 1-9 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for access control and encryption in multi-user systems.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A computer-implemented method comprising:
   storing, in a memory, instructions for performing the method;
   executing the instructions on a processor;
   according to the instructions being executed:
   obtaining an access control policy (ACP) that is associated with an encrypted information unit,
   wherein the encrypted information unit comprises data and metadata;
   wherein the encrypted information unit is stored in a storage system, wherein the storage system comprises a hierarchically linked chain of nodes;
   wherein each node stores a respective encrypted information unit;
   wherein each chain of nodes includes a zone root node, and a zone root key associated therewith; and
   wherein the metadata comprises an information unit encryption key (IUEK) as encrypted by an information unit encryption key (IUEK) stored in a parent encrypted information unit which occupies the most proximate previous linked node in a storage system;
   contacting a trusted storage with reference to the ACP that is associated with the encrypted information unit;
   receiving from the trusted storage a zone root key that corresponds to the ACP that is associated with the encrypted information unit; and
   using the zone root key, traversing an encryption key chain to decrypt an information unit encryption key that corresponds to the encrypted information unit,
   wherein traversing comprises:
   decrypting an information unit encryption key associated with the zone root node using the zone root key;
   decrypting one or more respective intermediate information unit encryption keys using respective information unit encryption keys stored in a respective most-proximate previous linked node in a storage system;
   wherein the encryption key chain comprises the information unit encryption keys, each one of the information unit encryption keys associated with a node in a chain of nodes which includes the encrypted information unit; and
   wherein the decrypting of the one or more respective intermediate information unit encryption keys comprises decrypting the information unit encryption key that corresponds to the encrypted information unit using the encryption key associated with the respective most-proximate previous linked node associated with the encrypted information unit.

2. The method as recited in claim 1, further comprising:
decrypting data of the encrypted information unit using the information unit encryption key.

3. The method as recited in claim 1, further comprising:
detecting that a second ACP is being merged into a first ACP;
responsive to the detecting, merging a second encryption zone associated with the second ACP into a first encryption zone associated with the first ACP by:
incorporating a second zone root key corresponding to the second encryption zone into an encryption key chain of the first encryption zone using a first zone root key corresponding to the first encryption zone; and
instructing the trusted storage to unpublish the second zone root key of an entry that associates the second ACP to the second encryption zone.

4. The method as recited in claim 1, further comprising:
detecting that a second ACP is being split from a first ACP that is associated with a first encryption zone;
responsive to the detecting, creating a second encryption zone that is associated with the second ACP by:
traversing an encryption key chain of the first encryption zone to extract an information unit encryption key for the second encryption zone, the extracted information unit encryption key comprising a second zone root key for the second encryption zone;
removing the information unit encryption key for the second zone root from an information unit thereof; and
instructing the trusted storage to publish the second zone root key in association with the second ACP.

5. A computer-implemented method comprising:
storing, in a memory, instructions for performing the method;
executing the instructions on a processor;
according to the instructions being executed:
obtaining an access control policy (ACP) that is associated with an encrypted information unit,
wherein the encrypted information unit comprises data and metadata;
wherein the encrypted information unit is stored in a storage system, wherein the storage system comprises a hierarchically linked chain of nodes;
wherein each node stores a respective encrypted information unit;
wherein each chain of nodes includes a zone root node, and a zone root key associated therewith; and
wherein the metadata comprises an information unit encryption key (IUEK) as encrypted by an information unit encryption key (IUEK) stored in a parent encrypted information unit which occupies the most proximate previous linked node in a storage system;
contacting a trusted storage with reference to the ACP that is associated with the encrypted information unit;
receiving from the trusted storage a zone root key that corresponds to the ACP that is associated with the encrypted information unit; and
using the zone root key, traversing an encryption key chain to decrypt an information unit encryption key that corresponds to the encrypted information unit,
wherein traversing comprises:
decrypting an information unit encryption key associated with the zone root node using the zone root key;
decrypting one or more respective intermediate information unit encryption keys using respective information unit encryption keys stored in a respective most-proximate previous linked node in a storage system;
wherein the encryption key chain comprises the information unit encryption keys, each one of the information unit encryption keys associated with a node in a chain of nodes which includes the encrypted information unit; and
wherein the decrypting of the one or more respective intermediate information unit encryption keys comprises decrypting the information unit encryption key that corresponds to the encrypted information unit using the encryption key associated with the respective most-proximate previous linked node associated with the encrypted information unit;
detecting that a second ACP is being merged into the ACP that is associated with the encrypted information unit;
responsive to the detecting, merging a second encryption zone associated with the second ACP into a first encryption zone associated with the first ACP by:
incorporating a second zone root key corresponding to the second encryption zone into an encryption key chain of the first encryption zone using the zone root key corresponding to the first encryption zone; and
instructing the trusted storage to unpublish the second zone root key of an entry that associates the second ACP to the second encryption zone.

6. A computer-implemented method comprising:
storing, in a memory, instructions for performing the method;
executing the instructions on a processor;
according to the instructions being executed:
obtaining an access control policy (ACP) that is associated with an encrypted information unit,
wherein the encrypted information unit comprises data and metadata;
wherein the encrypted information unit is stored in a storage system, wherein the storage system comprises a hierarchically linked chain of nodes;
wherein each node stores a respective encrypted information unit;
wherein each chain of nodes includes a zone root node, and a zone root key associated therewith; and
wherein the metadata comprises an information unit encryption key (IUEK) as encrypted by an information unit encryption key (IUEK) stored in a parent encrypted information unit which occupies the most proximate previous linked node in a storage system;
contacting a trusted storage with reference to the ACP that is associated with the encrypted information unit;
receiving from the trusted storage a zone root key that corresponds to the ACP that is associated with the encrypted information unit; and
using the zone root key, traversing an encryption key chain to decrypt an information unit encryption key that corresponds to the encrypted information unit,
wherein traversing comprises:
decrypting an information unit encryption key associated with the zone root node using the zone root key;
decrypting one or more respective intermediate information unit encryption keys using respective information unit encryption keys stored in a respective most-proximate previous linked node in a storage system;
wherein the encryption key chain comprises the information unit encryption keys, each one of the information unit encryption keys associated with a node in a chain of nodes which includes the encrypted information unit; and wherein the decrypting of the one or more respective intermediate information unit encryption keys comprises decrypting the information unit encryption key that corresponds to the encrypted information unit using the encryption key associated with the respective most-proximate previous linked node associated with the encrypted information unit;

detecting that a second ACP is being split from the ACP that is associated with a first encryption zone that is associated with the encrypted information unit;

responsive to the detecting, creating a second encryption zone that is associated with the second ACP by:

traversing an encryption key chain of the first encryption zone to extract an information unit encryption key for the second encryption zone, the extracted information unit encryption key comprising a second zone root key for the second encryption zone;

removing the information unit encryption key for the second zone root from an information unit thereof; and instructing the trusted storage to publish the second zone root key in association with the second ACP.

* * * * *